J. H. Tuttle,
Manf. Rubber Balls.
No. 92,763. Patented July 20, 1869.
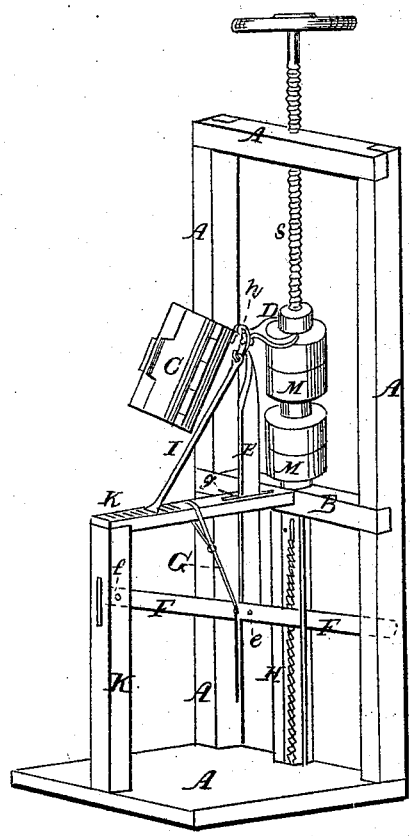
Witnesses
F. W. Howard
A. C. Bradley
John N. Tuttle
By his Attorney
Chas. F. Stansbury

United States Patent Office.

JOHN H. TUTTLE, OF EAST HAMPTON, MASSACHUSETTS.

Letters Patent No. 92,763, dated July 20, 1869.

IMPROVEMENT IN THE MANUFACTURE OF RUBBER BALLS.

The Schedule referred to in these Letters Patent and making part of the same.

*To all whom it may concern:*

Be it known that I, JOHN H. TUTTLE, of East Hampton, in the county of Hampshire, and State of Massachusetts, have invented a new and useful Improvement in the Manufacture of Rubber Balls; and I do hereby declare the following to be a full and correct description of the same, reference being had to the accompanying drawings, in which—

Figure 1 is a perspective view of the machine employed in the manufacture of my improved rubber balls.

The nature of my invention consists in the manufacture of rubber balls from ground vulcanized-rubber waste, unmixed with pure rubber or gutta-percha, by introducing said ground waste, under pressure, into moulds, which are afterwards subjected to heat, all as hereinafter more fully set forth.

I take the rubber waste left in the manufacture of rubber thread, and which has heretofore been regarded as of little or no value, and reduce it by grinding to a coarse powder.

This powder I introduce into moulds in the machine represented in the accompanying drawing, and which is constructed and operates as follows:

A marks a stout frame by which the operative parts are supported.

M M are ball-moulds, made in halves in the usual manner, and of the required size.

When in place in the machine, they rest on the cross-beam B, of the frame, or upon one another, as shown.

A screw, S, passes down through the upper member of the frame, to apply the necessary pressure to the moulds.

C is a hinged cylinder, which can be opened and closed, so as to surround the screw S, or be thrown back into the position it occupies in the figure.

It is hinged at $h$ to the upper end of clamp-rod E.

This rod has clamp D attached to its upper end, as shown.

Its lower end is pivoted at $e$ to lever F, which has its fulcrum at $f$ in upright K, and engages by one side with the teeth of the ratchet-bar H.

Lever F is raised by the elastic-rubber cord G.

A long pawl, I, hinged to the upper end of bar E, works in a ratchet on the top of the horizontal beam K.

Its office is to bring up and retract the clamp D, while the office of the bar E is to raise and draw down said clamp.

The cylinder C acts as a funnel to facilitate the introduction of the powdered waste into the mould. The screw S forces the halves of the mould together upon the enclosed material, and the clamp holds them shut while the screw is retracted for the introduction of another mould.

The operation is as follows:

The ground waste being prepared, the lower half of a mould is placed on the cross-beam B, its axis coinciding with that of the screw S. The cylinder C is now brought up around the mould and closed. The powdered material is next introduced in proper quantity through the upper end of cylinder C, and the upper half of the mould is placed upon it. The screw S is now driven down upon the upper half of the mould, and forces it into contact with the lower half, the rubber being condensed into the cavity of the mould.

The clamp is brought down by lever F, and holds the mould shut. The cylinder C is thrown back, the screw S retracted, a second mould is placed on top of the first, and the process repeated.

When the desired number of moulds is filled, they are locked in an independent clamp, and removed to a proper oven, to be subjected to heat, which completes the operation of manufacture.

The density and elasticity of the balls will depend upon the degree of pressure and heat to which they are subjected.

Having thus fully described my invention,

What I claim, and desire to secure by Letters Patent, is—

As a new article of manufacture, rubber balls made from pulverized-rubber waste, without the necessity of admixture with pure rubber or gutta-percha, by introducing said waste under pressure into moulds, which are afterwards subjected to heat, as specified.

The above specification of my said invention signed and witnessed at Washington, this 25th day of June, A. D. 1869.

JOHN H. TUTTLE.

Witnesses:
A. C. BRADLEY,
CHAS. F. STANSBURY.